March 10, 1953 W. A. SKARBEK 2,630,978
AUTOMATIC FISHING REEL
Filed March 27, 1952 2 SHEETS—SHEET 1
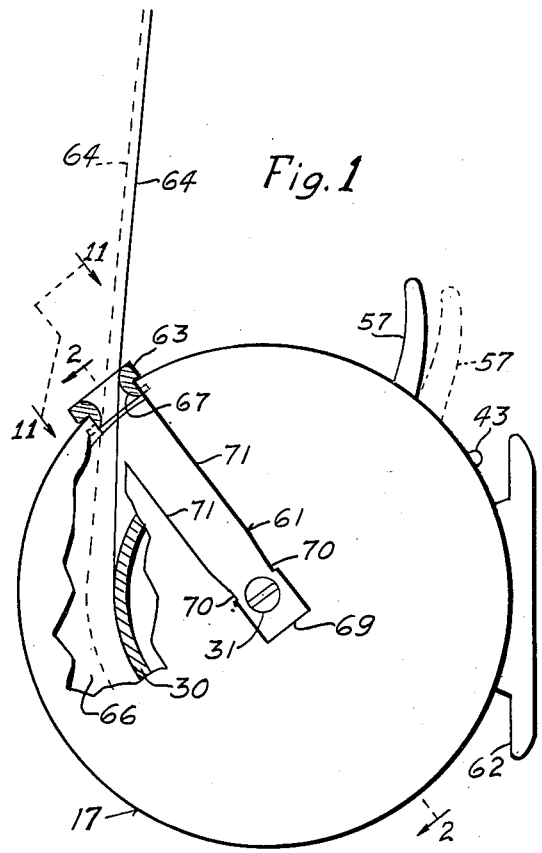
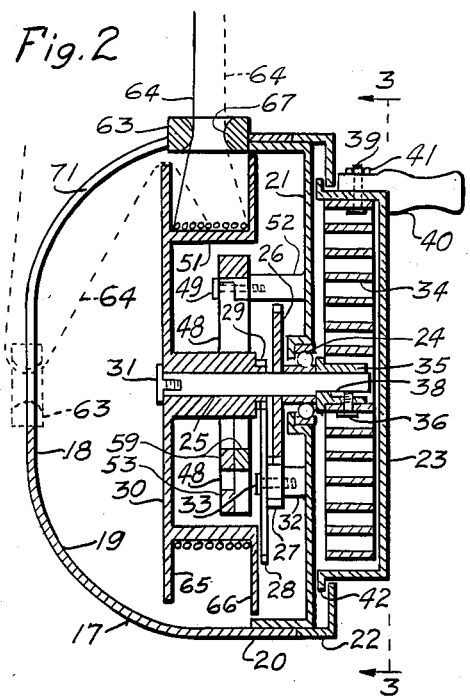
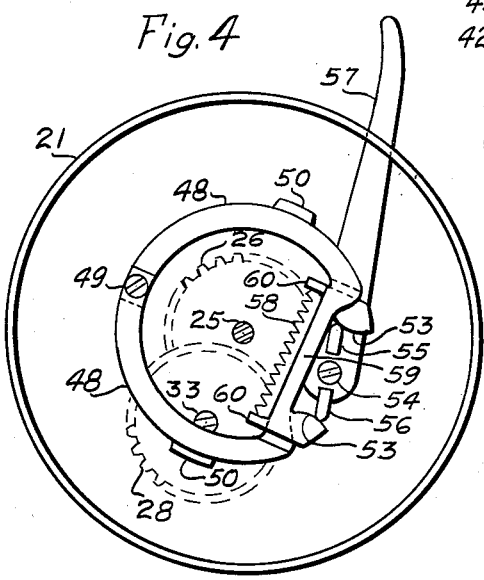
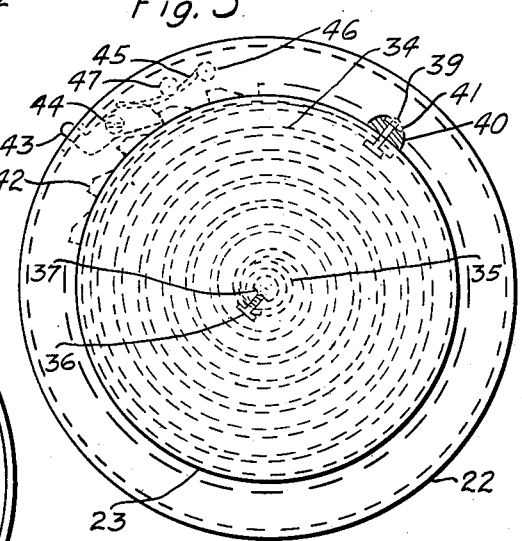
INVENTOR.
Walter A. Skarbek

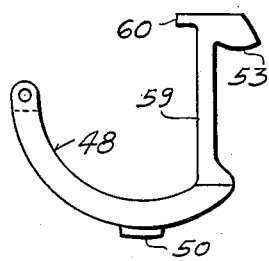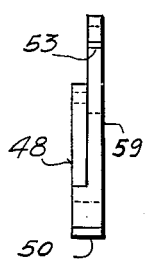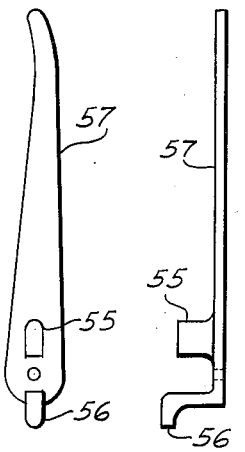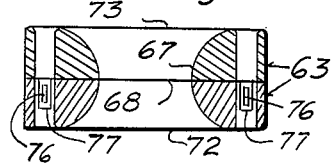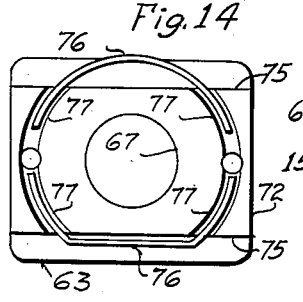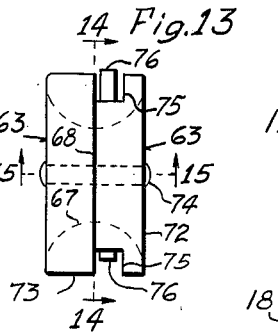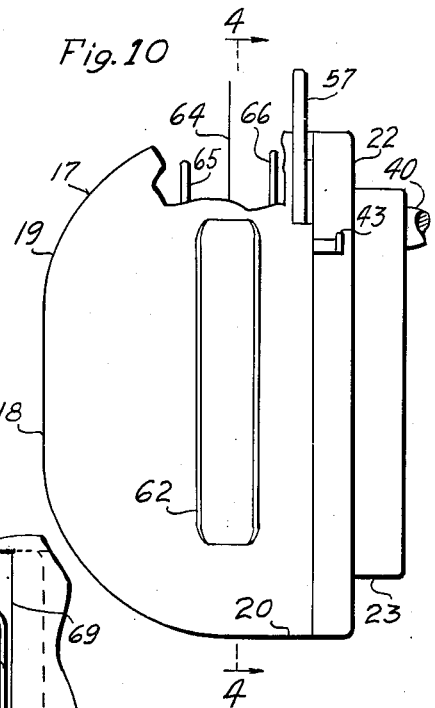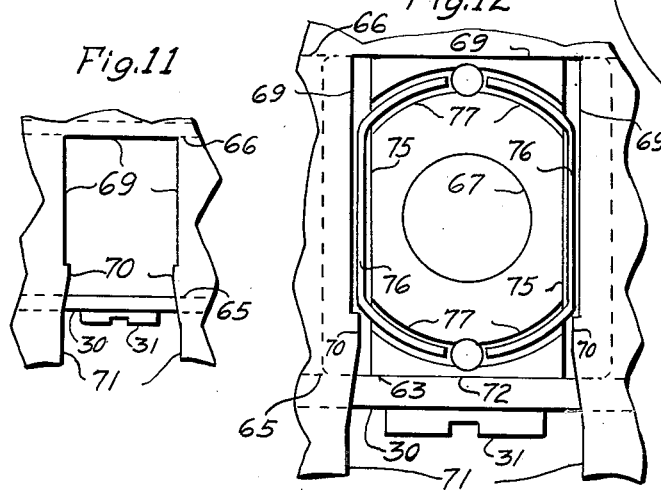

Patented Mar. 10, 1953

2,630,978

UNITED STATES PATENT OFFICE 2,630,978

AUTOMATIC FISHING REEL

Walter A. Skarbek, Denver, Colo.

Application March 27, 1952, Serial No. 278,884

5 Claims. (Cl. 242—84.3)

1

This invention relates to improvements in fishing reels and in particular to an improved automatic spinning reel.

It is known that the bait and hook on the end of a fishing line when used in conjunction with a spinning reel, is cast a great distance upon the water. Every cast that is made is not in the proper location upon the water, therefore it is necessary to retrieve the bait and line and make another cast. It will be understood that unless some motive means is provided to speedily wind the line upon the spool a great deal of time will be expended in performing the same manually. The need for speedily replenishing the power for the motive means is also apparent. When a fish line is cast upon the water at a great distance it is impossible to know what it may become entangled with. Be what it may, the line is strained a great deal in the process of winding it in upon the spool. In this time of predicament the line is in reciprocating motion and if it has to travel in sharp turns about any metal parts of the reel it will in time form grooves and sharp edges on said metal parts. It is therefore apparent that unless the fish line has an easy path to travel through and within the fishing reel case onto the spool the fishing line very often is strained to the breaking point. It is therefore the primary object of this invention to provide an automatic spinning reel.

It is another object to provide an automatic fishing reel in which a motor spring is used to supply the motive power for winding the fish line upon the spool and having a manually operable means for quickly tensioning said spring.

Another object is to provide an improved all purpose brake to hold the spool checked.

Another object of this invention is to reduce wear and strain upon the fish line while it is being wound upon the spool.

Other objects of this invention are explained in the following specification which describes one preferred form thereof. In the drawings:

Fig. 1 is a plan view of the automatic spinning reel with a portion of the cover removed;

Fig. 2 is a cross-sectional view through the device, taken on the line 2—2, of Fig. 1;

Fig. 3 is a view of the automatic reel on the line 3—3, Fig. 2, showing the convolution of the motor spring;

Fig. 4 is a view of the reel on the line 4—4, Fig. 10, showing the brake system as assembled in the inner case;

Figs. 5, 6 and 7 are detailed views of one segment of the brake system;

2

Figs. 8 and 9 are detailed views of the brake lever;

Fig. 10 is a side elevational view of Fig. 1;

Figs. 11 and 12 are detailed views on the line 11—11, Fig. 1, showing one extremity of the apertures; and, Figs. 13, 14 and 15 are detailed views of the slidable line guide.

Referring to the drawings in detail, the cover 17, the inner case 21, the outer case 22 and the motor spring case 23 constitute the housing of the improved reel device. The cover 17 having a circular end wall 18, a curved annular wall 19 and an annular cylindrical wall 20 will be described later.

In the ball bearing race 24 turns a shaft 25, carrying a driving gear 26. The driving gear meshes with a pinion gear 27 which is formed integral with a spur gear 28. Said spur gear meshes with a pinion gear 29 which is formed integral with the rotatable spool 30, and the latter is maintained upon the shaft 25, for rotation thereupon by a screw 31. The pinion 27 and the spur gear 28 are maintained in engageable position by a boss 32 and a screw 33.

One end of a motor spring 34 is secured to a driving sleeve 35 by a screw 36, said driving sleeve is keyed rotatively to the shaft 25 by means of a key 37 engageable in a keyway 38 upon said shaft. The other end of the motor spring is secured to the spring case 23 by a screw 39.

The handle 40 is secured to the spring case 23 and the motor spring 34, and maintained for rotation therewith by the screw 39 and the nut 41.

The ratchet wheel 42 formed integral with the spring case 23, is held from reverse rotation by a pawl 43 pivoted on a pin 44. The pawl is held engageable in the ratchet teeth by a wire spring 45. One end of said spring is wound about a post 46, the other end is maintained in tension upon the pawl 43 by the post 47.

The brake system comprises two like segments 48, 48 pivoted on the screw 49. The brake shoes 50, 50 are maintained in alignment for contact with the brake drum 51 by the boss 52. Midway between the opposing cam faces 53, 53 of the brake segment arms 59, 59 is a pivot pin 54 on which the fingers 55 and 56 of the brake lever 57 are pivoted. A resilient spring 58, attached to the posts 60, 60, connects the ends of the segment arms 59, 59. The influence of said spring 58 is in a direction to draw the ends of the segment arms 59, 59 to one another and thereby exert pressure of the brake shoes 50, 50 against the brake drum 51 to normally maintain the rotatable spool checked.

The cover 17 is provided with an elongated aperture 61 appropriately located in relation to the mounting bracket 62, so that the manually slidable fish line guide 63 is maintained in positive alignment, to eliminate a large amount of the wear and strain upon the fish line 64 when it is being retrieved. As shown in Fig. 10, the vertical center line of the mounting bracket 62 is 90 degrees to the axis of the shaft 25 and midway between the flanges 65 and 66 of the rotatable spool 30. The manually slidable line guide 63 is in a position for retrieving the fish line; when it is spaced apart of the outside diameters of the flanges 65 and 66, of the rotatable spool 30, the center of its circular opening 67 is central between said flanges and the joint surface 68 thereof is parallel with the axis of the shaft 25; in a casting position, when it is spaced apart of the smaller flange 65 of the rotatable spool 30, the joint surface 68 thereof is 90 degrees to the axis of the shaft 25 and the center of its circular opening 67 is in alignment with the axis of said shaft. These positions are governed by the boundary of the aperture 61, within which it is manually slidable. Part of cover 17 is broken away in Fig. 1 to show the relation of the fish line 64 to the line guide opening 67. The normal capacity of the rotatable spool 30 is three hundred feet of six pound test line. The solid fish line 64 is shown as it appears at the start of retrieving 300 ft. of the line upon the spool; and the dotted fish line 64 after the 300 ft. are wound upon the spool. The angle formed between the fish line 64 and the center line of a fishing pole as mounted on mounting bracket 62 is calculated to the nearest line guide (not shown) on a standard 9 ft. fishing pole. The nearest line guide in this case is 30 inches from the center of the manually slidable line guide 63. In Fig. 1 the rotation of the spool is anti-clockwise for retrieving the fish line thereon. It is apparent that at the start of winding the line upon the spool there is a slight amount of friction between the line and a side of the slidable line guide opening 67 in this plane. This friction diminishes as more and more of the line is wound upon the spool and said friction is entirely absent as approximately 150 ft. of the line is wound thereon. The balance of the line passes through the slidable line guide opening 67 without any friction upon either side in this plane. The extent of the friction between the fish line 64 and the sides of the line guide opening 67 in another plane, is shown in Fig. 2. This friction is not constant because, although this reel does not have a reciprocating mechanism to level wind the line upon the spool, the line, by natural causes covers the entire width of the rotatable spool 30 in the process of being wound thereon.

The aperture 61 has two terminals 69, 69 which are alike and two gateways 70, 70 alike with a free-way 71 between them. Fig. 11 is a detailed view of one extremity of the aperture 61 from which the slidable line guide 63 is removed to show the detail of its form. Figs. 13, 14 and 15 are detailed views of the manually slidable fish line guide 63. Fig. 13 is an end view of the assembly, showing the inner block 72 and the outer block 73 joined together on the joint surface 68 by two rivets 74, 74 (only one is shown in this view). Two straight channels 75, 75 are provided for the flat steel springs 76, 76 to operate in. The straight channels 75, 75 are the means by which the fish line guide 63 is maintained in the aperture 61. Fig. 14 is a plan view of the inner block 72 on the line 14—14, Fig. 13. The curved wells 77, 77 are provided for the reception of the flat steel springs 76, 76 (also see Fig. 15 which is a view on the line 15—15, Fig. 13). A barrier for the springs is provided when rivets 74, 74 are in place. One spring 76 is shown as flared, this being natural at this point of assembly. The other one is shown as both appear when the inner block 72 is at either of the terminals 69, 69, as shown in Fig. 12. They are compressed further when passing through the gateways 70, 70 and compressed to a lesser degree when in the free-way 71.

The improved reel operates in the following manner: When the reel is used for spin casting the fish line, the slidable line guide should be in a casting position. The operator may wind the motor spring 34 by choice, either before or after the casting of the line, this being accomplished by rotating the spring case 23 in a clockwise direction, by the use of the handle 40. Assuming that the cast has been made, the motor spring has been tensioned, and the slidable line guide 63 has been moved to the retrieving position, the only procedure necessary then to retrieve the bait and line is to press the brake lever 57 toward the fishing rod handle.

When the reel is used as a conventional automatic reel, the procedure then is to have the slidable line guide 63 in the retrieving position as shown in Fig. 1, to have a small amount or no tension upon the motor spring 34, to withdraw or unwind a desired amount of the fish line 64 from the rotatable spool 30 thereby causing the motor spring 34 to be wound from the inner end, instead of from the outer end as before explained, the result of winding the spring from either end being the same. The tension of spring 58 is of sufficient amount to maintain the rotatable spool 30 checked, while the fish line 64 is being cast, while the motor spring 34 is wound to tension the same and after said motor spring has been so tensioned. It is not equal to maintaining said rotatable spool checked against the manual withdrawing or unwinding of said line 64 from said spool 30. By choice, the operator may press the brake lever 57 toward the fishing rod handle while withdrawing the fish line 64 from said spool 30, thereby permitting easier unwinding of said line 64. After casting that part of the line 64 which had been withdrawn from the spool 30, the same procedure is followed to retrieve the line as explained before.

The pawl 43 is formed and mounted so that a part of it protrudes through the back case 22 for the purpose of releasing any tension that may remain upon the motor spring 34 so as to conserve it while not in use.

The larger parts of the reel, such as the cover and the cases may be formed from sheet aluminum by the stamping and punching processes. Other parts, such as the brake segments and lever may be formed of a suitable light weight material, such as aluminum, by the die casting method.

It may be observed from the foregoing description of my invention that I have provided numerous inovations heretofore unobtainable in other fishing reels. Changes may be made in the various parts, or the arrangement and construction thereof, without departing from the scope of this invention. I therefore claim as new:

1. In an automatic fishing reel, the combination of: a housing adapted for mounting on a fishing pole, said housing including a cover having a circular end wall, a curved annular wall and an annular cylindrical wall; an aperture in said cover having two terminals, a checking means adjoining each terminal and a free-way between said checking means; a spool rotatable in said housing and adapted to support a fishing line, said spool having a brake drum; a fish line guide associated with said aperture and adapted for manual movement therein, said line guide having a central circular opening for the passing through of the fish line; a means in said line guide engageable with said checking means adjoining each terminal, to maintain said line guide checked in said terminals; a motor spring in said housing; a set of meshing gears interposed between said spool and said motor spring and operatively connecting the same; a rotatable ratchet wheel operatively connected to said motor spring; a manually operable handle operatively connected to said ratchet wheel to wind said motor spring to tension the same; a moveable pawl normally engageable with said ratchet wheel maintaining said motor spring in its tensioned condition and adapted to release said tension upon said motor spring; a spring-actuated brake provided with two shoes spaced apart for contact with said brake drum at 180 degrees to normally withhold said spool from rotation; two brake segment arms pivoted in said housing on the same pivot pin, each of said arms having a cam face; and a manually operable pivoted lever extending through the periphery of said housing having two fingers pivoted within said housing on the same pivot pin, said fingers having tips thereof spaced radially apart of said pivot pin on 180 degrees and in constant engagement with said cam faces, and adapted, upon pivotal movement of said lever, to withdraw said spring-actuated brake shoes from contact with said brake drum to allow said spool to rotate in a direction to wind the fish line thereon under the influence of said motor spring and/or to permit the manual unwinding of the fish line from said spool causing said spool to rotate in the reverse direction, thereby winding said motor spring to tension the same.

2. In an automatic spinning reel, the combination of: a housing adapted for mounting on a fishing pole; an aperture in the wall of said housing; a spring-actuated manually slidable line guide associated with said aperture; a terminal at one extremity of said aperture adapted to maintain said line guide checked in a casting position for a fish line; a terminal at the other extremity of said aperture, 90 degrees removed from said casting positioning terminal and adapted to maintain said line guide checked in a retrieving position for said fish line; two gateways in said aperture, one adjacent to each said terminal and a free-way between said gateways, said free-way adapted to permit free slidable movement for said line guide within it, and said gateways adapted to permit easy passage for said line guide through them; a spool rotatable in said housing and adapted to support a fishing line, said spool having a brake drum; a motor spring in said housing; a set of meshing gears interposed between said spool and said motor spring and operatively connecting the same; a manually operable handle attached to the periphery of said housing to wind said motor spring to tension the same; a spring-actuated pawl to maintain said tension upon said motor spring; a spring-actuated brake having two shoes spaced apart for contact with said brake drum to maintain said rotatable spool checked; a brake lever extending through the periphery of said housing, adapted to remove said checking influence of said brake upon said spool to permit said motor spring, through the medium of said set of meshing gears, to rotate said spool in a direction to wind said line thereon; and means for releasing said tension upon said motor spring without rotating said spool.

3. In an automatic spinning reel, the combination of: a housing adapted for mounting on a fishing pole, said housing including a cover having a circular end wall, a curved annular wall and an annular cylindrical wall; an aperture in said cover having a terminal in said circular end wall, a terminal in said annular cylindrical wall, a gateway adjoining said terminal in said annular cylindrical wall, a gateway adjoining said terminal in said circular end wall, and a free-way in said curved annular wall connecting said gateways; a spool rotatable in said housing and adapted to support a fishing line, said spool having a brake drum; a manually slidable line guide having a central circular opening and disposed in a said terminal wherein it is radially apart from said spool and centrally in alignment between the flanges thereof, and moveable, to another said terminal wherein it is apart from a side of said spool and the center of its said circular opening is in alignment with the axis of said spool; a means within said slidable line guide engageable with said gateways to maintain said line guide checked in said terminals; a motor spring in said housing; a set of meshing gears interposed between said spool and said motor spring and operatively connecting the same; a manually operable handle attached to the periphery of said housing to wind said motor spring to tension the same; a spring-actuated pawl to maintain said tension upon said motor spring, said pawl having a means to manually release said tension upon said motor spring without rotating said spool; a spring-actuated brake having two shoes spaced apart for contact with said brake drum to normally maintain said rotatable spool checked against the influence of said motor spring; and a manually operable pivoted lever extending through the periphery of said housing having two pivoted fingers engageable with said brake, and adapted, upon pivotal movement of said lever, to disengage said brake to permit said spool to rotate in a direction to wind said fish line thereon under the influence of said motor spring and/or to permit the manual unwinding of said fish line from said spool causing rotation of said spool in a reverse direction thereby winding said motor spring to tension the same.

4. In an automatic spinning reel, the combination of: a housing adapted for mounting on a fishing pole; an aperture in the wall of said housing; a manually slidable line guide associated with said aperture; a terminal at one extremity of said aperture adapted to maintain said line guide checked in a casting position for a fish line; a terminal at the other extremity of said aperture, 90 degrees removed from said casting positioning terminal and adapted to maintain said line guide checked in a retrieving position for said fish line; two gateways in said aperture, one adjacent to each terminal and a free-way in said aperture between said gateways, said free-way adapted to permit free slidable movement for said line guide within it, and said gateways adapted to permit easy passage for said line guide through them; a spool rotatable in said housing and adapted to support a fishing line, said spool having a brake drum; a motor spring in said housing; a set of meshing gears interposed between said spool and said motor spring and operatively connecting the same; a manually operable handle attached to a rotatable means to tension said motor spring; a spring-actuated means adapted to maintain said tension upon said motor spring, said means manually operable to release said tension upon said motor spring without rotating said spool; a spring-actuated means having two pivoted shoes engageable with said brake drum for maintaining said rotatable spool checked, said pivoted shoes carried by two arms; a cam face adjoined to the end of each said arm; a resilient means connecting the ends of said arms to draw said ends of arms closer to one another and at the same time to spread said pivoted shoes further apart from each other; and two pivoted fingers interposed between said cam faces and engageable therewith, said fingers having a lever for manually pivoting the same in a direction to disengage said spring-actuated means holding said spool checked, to allow said motor spring, through the medium of said set of meshing gears, to rotate said spool in a direction to wind the line thereon.

5. In an automatic spinning reel as defined in claim 4 in which said manually slidable line guide includes two channels adapted to maintain said line guide in slidable operation within said aperture; two openings in each channel, each of said openings having a curved well adjoined thereto; a flat steel spring suspended between the openings in each channel and adapted to exert pressure upon the sides of said aperture; and each end of said flat steel spring slidably disposed in said curved wells.

WALTER A. SKARBEK.

REFERENCES CITED

The following references are of record in the file of this patent:

UNITED STATES PATENTS

| Number | Name | Date |
|---|---|---|
| 2,551,320 | Ferguson | May 1, 1951 |
| 2,561,935 | McCash | July 24, 1951 |